United States Patent
Barker et al.

(10) Patent No.: US 7,996,908 B2
(45) Date of Patent: *Aug. 9, 2011

(54) METHOD AND SYSTEM FOR COORDINATING CLIENT AND HOST SECURITY MODULES

(75) Inventors: Melanie Barker, Kanata (CA); John Hodgson, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 1042 days.

This patent is subject to a terminal disclaimer.

(21) Appl. No.: 10/984,822

(22) Filed: Nov. 10, 2004

(65) Prior Publication Data

US 2006/0026689 A1    Feb. 2, 2006

Related U.S. Application Data

(60) Provisional application No. 60/592,141, filed on Jul. 30, 2004.

(51) Int. Cl.
*G06F 21/00* (2006.01)
(52) U.S. Cl. ........... 726/26; 726/21; 726/27; 726/34; 726/35; 726/4; 726/8; 726/9; 713/100; 713/151; 713/165; 713/183; 713/184; 713/185
(58) Field of Classification Search ............ 726/21, 726/26, 34, 27, 35, 4, 8, 9; 713/165, 100, 713/151, 183–185; 455/411, 558
See application file for complete search history.

(56) References Cited

U.S. PATENT DOCUMENTS

| | | | | |
|---|---|---|---|---|
| 5,097,506 A | * | 3/1992 | Kaiser et al. | 726/19 |
| 5,289,540 A | * | 2/1994 | Jones | 713/165 |
| 5,313,639 A | * | 5/1994 | Chao | 726/19 |
| 5,355,414 A | * | 10/1994 | Hale et al. | 726/34 |
| 5,359,660 A | * | 10/1994 | Clark et al. | 726/3 |
| 5,542,044 A | * | 7/1996 | Pope | 726/9 |
| 5,557,674 A | * | 9/1996 | Yeow | 713/193 |
| 5,727,155 A | * | 3/1998 | Dawson | 709/205 |
| 5,761,071 A | * | 6/1998 | Bernstein et al. | 700/237 |
| 5,787,169 A | | 7/1998 | Eldridge et al. | |
| 5,836,010 A | * | 11/1998 | Kim | 726/20 |
| 6,041,385 A | * | 3/2000 | Shipman et al. | 710/200 |
| 6,056,193 A | * | 5/2000 | McAuliffe et al. | 235/380 |
| 6,065,056 A | | 5/2000 | Bradshaw et al. | |

(Continued)

FOREIGN PATENT DOCUMENTS

CN    1278082    5/2000

(Continued)

OTHER PUBLICATIONS

Supplementary European Search Report for EP04797196 dated Jan. 21, 2008 (no commentary).

(Continued)

*Primary Examiner* — Carl Colin
(74) *Attorney, Agent, or Firm* — Ridout & Maybee LLP

(57) ABSTRACT

A system and methods for coordinating the operation of a client security module and a host security module on a mobile electronic device. The modules communicate with each other through a platform abstraction layer using application programming interfaces to coordinate their activities. In particular, the client security module instructs the host security module when to lock and unlock the device, and the host security module alerts the client security module to attempts by the user to lock or unlock the device.

10 Claims, 4 Drawing Sheets

U.S. PATENT DOCUMENTS

| | | | |
|---|---|---|---|
| 6,078,848 A * | 6/2000 | Bernstein et al. | 700/237 |
| 6,098,171 A | 8/2000 | Johnson et al. | |
| 6,134,593 A * | 10/2000 | Alexander et al. | 709/229 |
| 6,151,678 A | 11/2000 | Davis | |
| 6,230,181 B1 * | 5/2001 | Mitchell et al. | 718/100 |
| 6,256,019 B1 * | 7/2001 | Allport | 345/169 |
| 6,262,719 B1 * | 7/2001 | Bi et al. | 345/179 |
| 6,321,079 B1 | 11/2001 | Cooper | |
| 6,339,795 B1 * | 1/2002 | Narurkar et al. | 709/246 |
| 6,370,362 B1 * | 4/2002 | Hansen et al. | 455/90.1 |
| 6,449,492 B1 * | 9/2002 | Kenagy et al. | 455/550.1 |
| 6,487,665 B1 * | 11/2002 | Andrews et al. | 726/26 |
| 6,507,351 B1 * | 1/2003 | Bixler | 715/810 |
| 6,516,351 B2 * | 2/2003 | Borr | 709/229 |
| 6,611,607 B1 | 8/2003 | Davis et al. | |
| 6,662,023 B1 * | 12/2003 | Helle | 455/558 |
| 6,813,682 B2 * | 11/2004 | Bress et al. | 711/112 |
| 6,892,081 B1 * | 5/2005 | Elomaa | 455/575.1 |
| 6,906,696 B2 * | 6/2005 | Allport | 345/156 |
| 6,959,330 B1 * | 10/2005 | McIlroy | 709/221 |
| 7,167,934 B1 * | 1/2007 | Dunn et al. | 710/52 |
| 7,256,726 B2 * | 8/2007 | Bejean | 341/176 |
| 7,343,014 B2 | 3/2008 | Sovio | |
| 7,426,643 B2 * | 9/2008 | Homer et al. | 713/186 |
| 7,464,412 B2 | 12/2008 | Avraham et al. | |
| 2002/0040346 A1 * | 4/2002 | Kwan | 705/51 |
| 2002/0066039 A1 * | 5/2002 | Dent | 713/202 |
| 2002/0101993 A1 * | 8/2002 | Eskin | 380/270 |
| 2003/0088780 A1 * | 5/2003 | Kuo et al. | 713/185 |
| 2003/0106935 A1 * | 6/2003 | Burchette, Jr. | 235/380 |
| 2003/0159059 A1 | 8/2003 | Rodriquez et al. | |
| 2003/0159071 A1 | 8/2003 | Martinez et al. | |
| 2003/0204403 A1 * | 10/2003 | Browning | 704/270 |
| 2003/0212751 A1 * | 11/2003 | Mathewson, II | 709/208 |
| 2003/0222854 A1 | 12/2003 | Yuguri et al. | |
| 2003/0226025 A1 * | 12/2003 | Lin et al. | 713/193 |
| 2004/0030932 A1 | 2/2004 | Juels et al. | |
| 2004/0093582 A1 * | 5/2004 | Segura | 717/102 |
| 2004/0103317 A1 * | 5/2004 | Burns | 713/201 |
| 2006/0005187 A1 | 1/2006 | Neil | |
| 2006/0010433 A1 | 1/2006 | Neil | |
| 2006/0026689 A1 * | 2/2006 | Barker et al. | 726/26 |
| 2006/0036570 A1 | 2/2006 | Schaefer et al. | |
| 2006/0123056 A1 * | 6/2006 | Darbha et al. | 707/104.1 |
| 2007/0168292 A1 | 7/2007 | Jogand-Coulomb | |

FOREIGN PATENT DOCUMENTS

| | | |
|---|---|---|
| EP | 1 158 745 | 11/2001 |

OTHER PUBLICATIONS

Extended European Search Report for EP09180500.2 dated Apr. 27, 2010.

Examination Report for EP04797196 dated Jun. 24, 2008.

Summons to attend oral proceedings from EP04797196 dated Apr. 8, 2010.

* cited by examiner

METHOD AND SYSTEM FOR COORDINATING CLIENT AND HOST SECURITY MODULES

CROSS-REFERENCE TO RELATED APPLICATIONS

The present application claims priority to U.S. provisional patent application Ser. No. 60/592,141, filed Jul. 30, 2004 and owned in common herewith.

FIELD OF TECHNOLOGY

The present application relates to a client application operating upon a third-party host device and, in particular, coordinating the operations of a client security module and a host security module.

BACKGROUND INFORMATION

Successful client applications providing a particular functionality are often desirable additions to third-party devices directed to related but different functions. For example, mobile telephones, which typically provide voice call capability and text messaging functions, may find it advantageous to incorporate a client application provided by another entity that enables the mobile phone to be used for wireless data communication. In one example, the client application may enable e-mail communications using the mobile phone.

Placing an existing client application on a mobile phone having its own architecture and operating platform may result in conflicts between specific modules within the client application and certain modules operating within the mobile phone host system. For example, the client application may include a security module for implementing a set of client security policies. The mobile phone may feature its own host security module for implementing its security features. The security features implemented by the host security module for the mobile phone may differ or conflict with the security policies implemented by the client security module. Accordingly, there is a need to ensure that the client security module and the host security module coordinate their security activities to maintain an adequate level of data security.

BRIEF SUMMARY

The present application describes a system and methods for coordinating the operation of a client security module and a host security module. The modules communicate with each other through a platform abstraction layer using application programming interfaces to coordinate their activities. In particular, the client security module instructs the host security module when to unlock the device, and the host security module alerts the client security module to attempts to lock or unlock the device.

In one aspect, the present application provides a method for coordinating a client security module with a host security module, wherein both modules are resident on a mobile electronic device. The method includes the steps of detecting a lock event; implementing a first lock operation by one of the client security module and the host security module; sending a lock command from the one of the client security module and the host security module to the other of the client security module and the host security module; and initiating a lock operation at the other of the client security module and the host security module in response to the lock command.

In another aspect, the present application provides a method for coordinating a client security module with a host security module, wherein both modules are resident on a mobile electronic device. The method includes the steps of receiving a user security input; validating the received user security input; performing a first unlock operation by one of the client security module and the host security module; sending an unlock command from the one of the client security module and the host security module to the other of the client security module and the host security module; and initiating a second unlock operation at the other of the client security module and the host security module in response to the unlock command.

In yet another aspect, the present application provides a mobile electronic device. The device includes a host operating system and a host security module, wherein the host operating system and the host security module are resident on a host-side of the device. The device also includes a client application, the client application including a client security module, wherein the client application is resident on a client-side of the device. An abstraction interface layer is provided between the client-side and the host-side, the abstraction layer including a plurality of application programming interfaces for exchanging communications between the client security module and the host security module.

Other aspects and features of the present application will be apparent to one of ordinary skill in the art in light of the following detailed description and drawings depicting one or more embodiments.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Figure 1:
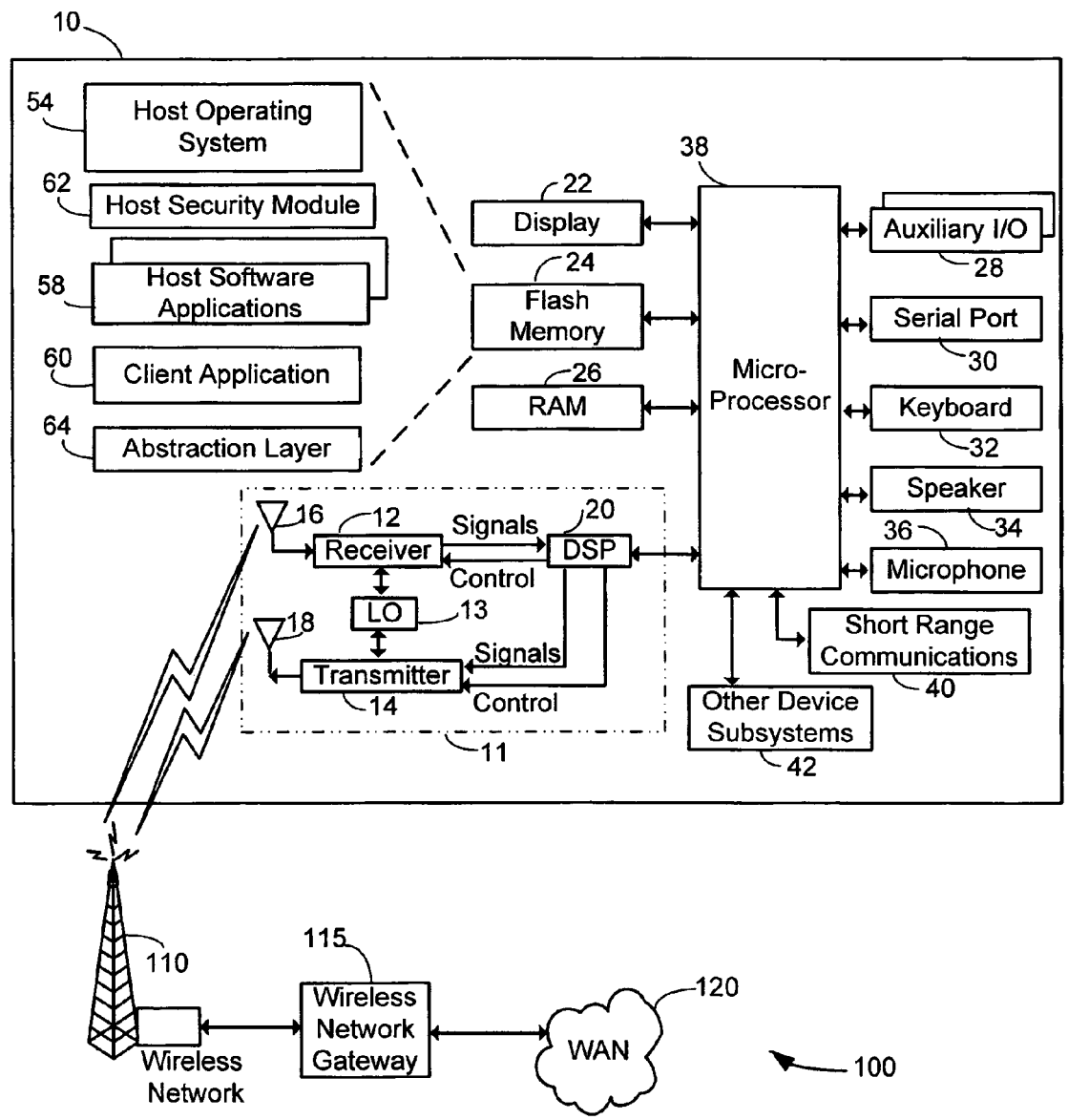
FIG. 1 is a block diagram of a mobile electronic device and a communications system.

Referring first to FIG. 1, there is a block diagram of a communication system 100 and mobile electronic device 10 to which example embodiments of the present application may be applied. The communication system 100 includes mobile electronic devices 10 (only one of which is shown in FIG. 1), a wireless network 110 for communicating with the mobile electronic devices 10, and a wireless network gateway 115 for interfacing the wireless network 110 with a Wide Area Network (WAN) 120.

In the embodiment of FIG. 1, the mobile electronic device 10 is a hand-held two-way mobile communication device 10 having at least data and possibly also voice communication capabilities. In an example embodiment, the device has the capability to communicate with other computer systems on the Internet. In various embodiments, mobile electronic devices 10 includes data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of mobile wireless communication devices. In the presently described embodiment, each of the mobile electronic devices 10 is configured to operate within the wireless network 110. It should be appreciated however that the present application is in no way limited to these example types of devices and may be implemented in other devices. Example embodiments may also be applied to non-wireless enabled devices.

The device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem includes local oscillator(s) (LO) 13, and in some embodiments the communication subsystem and microprocessor 38 share an oscillator. As will be apparent to those skilled in the field of communications, the particular design of the communication subsystem 11 will be dependent upon the communication network in which the device is intended to operate.

Signals received by the antenna 16 through a wireless communication network 110 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 110 via the antenna 18.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Host operating system software 54 and various host software applications 58 used by the microprocessor 38 are, in one example embodiment, stored in a persistent store such as flash memory 24 or similar storage element. Host software applications 58 may include a wide range of applications, including a text messaging application, a ring tone application, a contacts application, and/or a game application. Those skilled in the art will appreciate that the host operating system 54, specific host applications 58, or parts thereof, may be temporarily loaded into a volatile store such as RAM 26. It is contemplated that received communication signals may also be stored to RAM 26.

The microprocessor 38, in addition to its operating system functions, enables execution of host software applications 58 on the device. A predetermined set of host applications 58 which control basic device operations, including at least voice communication applications for example, will normally be installed on the device 10 during manufacture. Further applications may also be loaded onto the device 10 through the network 110, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a communication mode, a received signal such as a voice call, a text message, or web page download will be processed by the communication subsystem 11 and input to the microprocessor 38, which will preferably further process the received signal for output to the speaker 34 or the display 22, or alternatively to an auxiliary I/O device 28. A user of device 10 may also compose data items such as text messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 110 is, in an example embodiment, a wireless packet data network, (e.g. Mobitex™ or DataTAC™), which provides radio coverage to mobile electronic devices 10, although it could be any other types of wireless networks. Wireless mobile network 110 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

The device 10 includes a host security module 62. The host security module 62 may be one of the host software applications 58 resident on the device 10. The host security module 62 implements security measures in accordance with the security policies of the device 10. For example, the host security module 62 may monitor idle time of the device and display a security screen, i.e. screen saver, if an idle threshold time is exceeded. In some embodiments, the host security module 62 may permit a user to lock the keyboard or keypad 32. Those of ordinary skill in the art will appreciate that other security or locking features may be implemented by the host security module 62. It will be appreciated by those of ordinary skill in the art that the host security module 62, while depicted as a distinct entity in FIG. 1, may be spread across multiple entities. For example, the host security module 62 may comprise a module for monitoring idle time, a module for displaying a security screen for blocking device access, and a module for locking the keypad. In various embodiments, these or other modules may be stand-alone modules, may be implemented within the host operating system 54, or may implemented within one or more of the host software applications 58. It will be appreciated that references herein to the host security module are intended to encompass all of these variations and alternatives.

In addition to the host applications 58 resident on the device 10, a client application 60 is included with the device 10. The client application 60 may be, for example, a wireless data communication application. The wireless data communication application may, for example, enable the receipt and transmission of electronic messages. In one embodiment, the wireless data communication application may provide for electronic messaging, i.e. E-mail, that is synchronised and co-ordinated with a remote electronic messaging server, wherein the remote electronic messaging server is coupled to the WAN 120 at a remote location. Electronic messaging functions provided by the wireless data communication application may include composing messages, saving messages, and displaying messages. Other functions or features may include a contacts list or directory, a calendar application, a task list application, a web browser, and other modules or applications. The client application 60 is a self-contained stand-alone entity that may have been designed to operate upon a specific 'native' device, as will be described in greater detail below.

The client application 60 is typically created and developed by a separate entity than the remainder of the mobile electronic device 10. The client application 60 is also typically associated with a native environment or device in association with which it was originally developed. Accordingly, the client application 60 includes the functions and features associated with its operation on its native device, but packaged as a stand-alone software entity designed to run on top of a third-party platform in a third-party device. To enable the client application 60 to interact and exchange messages and events with the host operating system 54 and/or the host security module 62 and other host applications 58, the device 10 may further include an abstraction layer 64. The abstraction layer 64 contains or defines a set of application programming interfaces (APIs) that may be used by the client application 60 or by the host operating system 54 and/or host security module 62 and/or the host applications 58 to exchange instructions, messages or events between the host-side of the device 10 and the client application 60.

Although the set of APIs is depicted in FIG. 1 as being contained in the abstraction layer 64, those of ordinary skill in the art will appreciate that the APIs that make up the abstraction layer 64 need not be collected and contained within a single library or file. It will also be appreciated that the term "application programming interface" in this context is intended to encompass a wide range of inter-process communications taking many forms. For example, in one embodiment, the APIs may comprise defined functions that are called by a process. In another embodiment, the APIs may comprise the posing of messages from one process to another process. Those of ordinary skill in the art will appreciate the range of possible interfaces that may be employed for inter-process communication. References herein to "calling" an API are not intended to limit the scope of the operation to calling a predefined function, but instead are intended to encompass all possible forms of interfacing.

Figure 2:
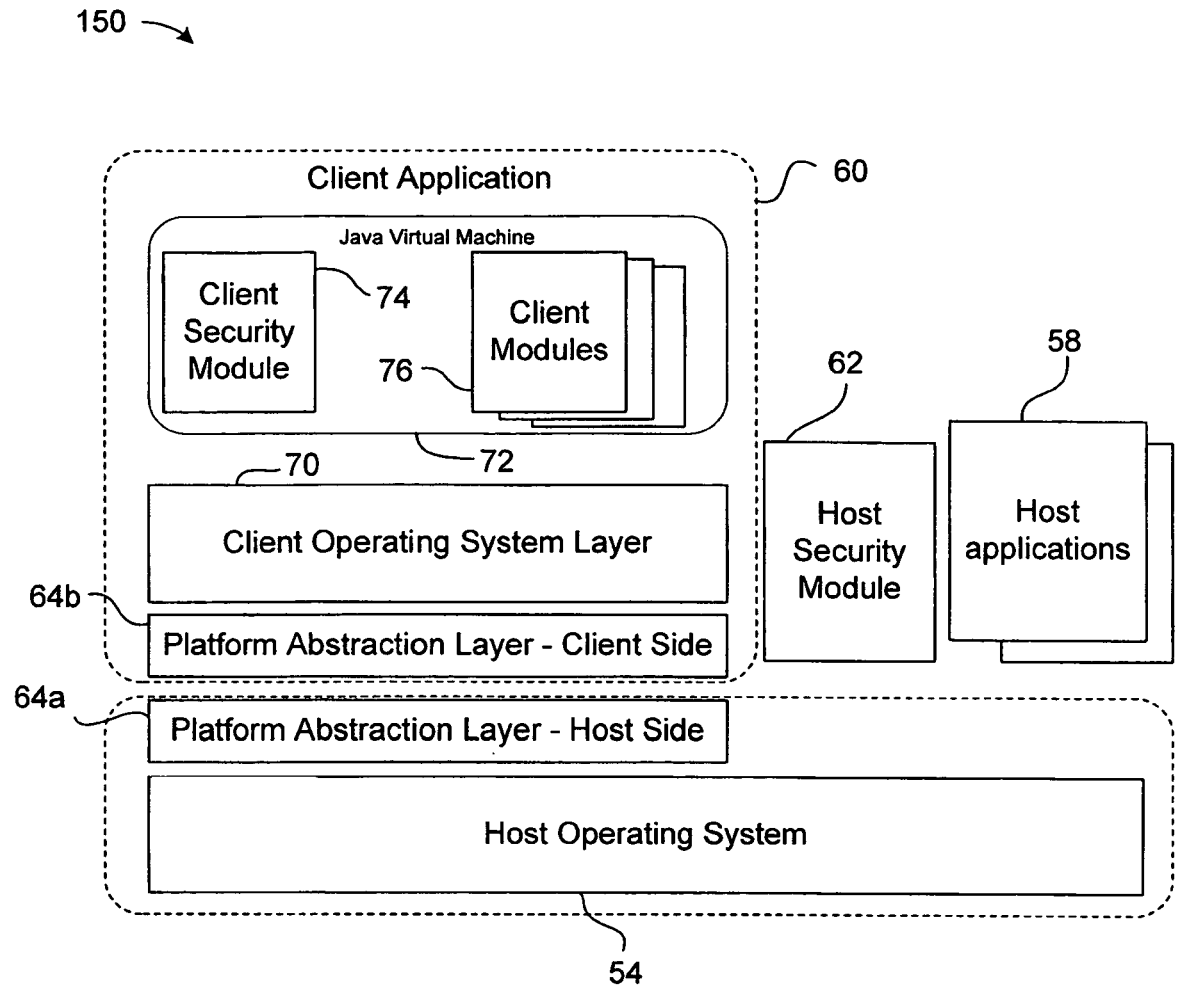
FIG. 2 diagrammatically shows a system software architecture for a mobile electronic device, such as the device shown in FIG. 1.

Reference is now made to FIG. 2, which diagrammatically shows a system software architecture 150 for a mobile electronic device, such as the device 10 shown in FIG. 1. As shown in FIG. 2, the client application 60, the host security module 62, and the host applications 58 operate on top of the host operating system 54 layer.

The client application 60 includes a client operating system layer 70. The client operating system layer 70 may, under some definitions, not be considered an "operating system" per se, but instead may be referred to as an I/O management layer or a platform. The client operating system layer 70 manages certain basic functions for the client application 60, including file structure and I/O. The client operating system layer 70 provides an independent platform upon which client-specific applications can run.

On top of the client operating system layer 70, the client application 60 may include a Java layer 72 or Java Virtual Machine, within which various client modules 76 operate including a client security module 74. The client security module 74 manages the security features of the client application 60. For example, the client security module 74 may implement a password lock-out function, whereby the client application 60 and related data are inaccessible to a user without entering a valid password. In another embodiment, the client security module 74 may implement a "keypad" locking system requiring a certain keystroke sequence or key combination to unlock the keypad or keyboard. The client security module 74 may include a user interface for receiving a user password.

The system software architecture 150 further includes the platform abstraction layer 64. The platform abstraction layer 64 may be notionally divided into a host-side platform abstraction layer 64a and a client-side platform abstraction layer 64b. The platform abstraction layer 64 enables the communication of messages and events back and forth between the client application 60 and the host operating system 54 and/or the host security module 62 and/or the host applications 58. The platform abstraction layer 64 may be implemented through use of one or more APIs. The platform abstraction layer 64 allows the client application 60 to operate on a platform-independent basis from the host operating system 54, the host applications 58, and the host security module 62.

The client security module 74 typically implements a set of security features to protect the user data and other data associated with the client application 60. In its native environment, the client security module 74 may maintain a certain level of security with regard to the client application 60 that differs from the security normally associated with the device 10 as provided by the host security module 62. The host security module 62 may implement security features that are inadequate for the level of security wanted by the client application 60. Because some user data or other data associated with the client application 60 may be mirrored or copied to storage on the host-side of the device 10, some coordination between the security modules 62, 74 may be needed to ensure adequate security protection for the data. In particular, the client security module 74 and the host security module 62 coordinate their activities so as to lock and unlock the device in accordance with the same security policies.

It will be appreciated that certain functions of the device 10 continue to operate in spite of the locks although the user cannot access the applications 60, 58. For example, where the client application 60 comprises a wireless data communication application, the wireless data communication application may continue to communicate with a wireless network to receive and/or exchange data.

Figure 3:
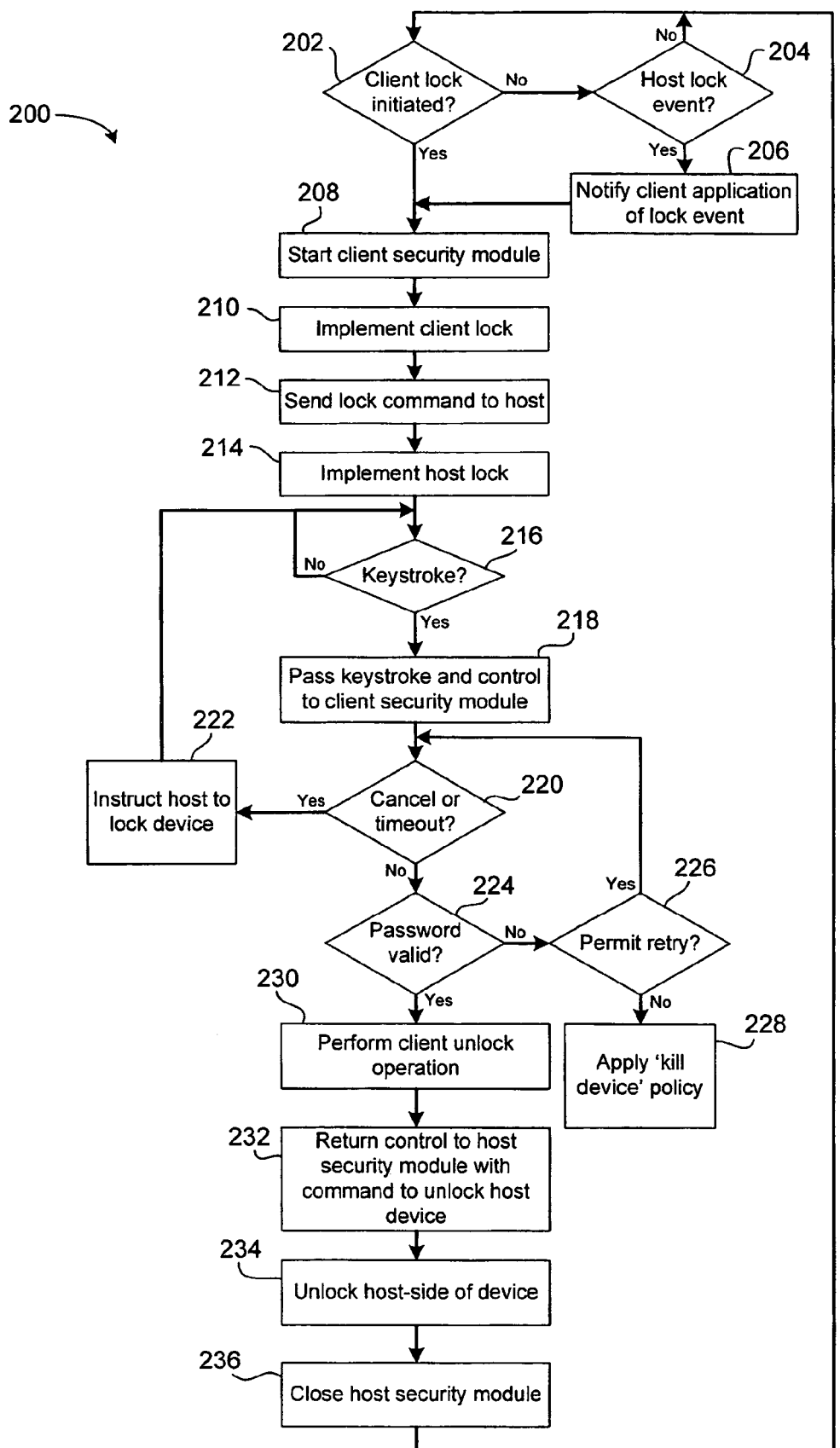
FIG. 3 shows, in flowchart form, a method for coordinating a client security module and a host security module.

Reference is now made to FIG. 3, which shows, in flowchart form, a method 200 of coordinating operation of separate security modules on a mobile device. The method 200 is based upon a device having a client application with a client security module that implements a password protection feature. The device also has a host security module that implements a screen saver mode. It will be appreciated that the security modules may implement alternative or additional security features. For example, the host security module may implement a keypad lock feature.

The method 200 begins with the presumption that the device is in an unlocked state. At step 202, the device determines if a client lock has been initiated by a user or a remote administrator. The client security module may allow a user to select a 'lock device' operation, for example from a menu. If the device, or more particularly, the client application, receives a client instruction or a remote administrator instruction to perform a client lock, then the method 200 continues to step 208. If not, then it continues at step 204, wherein the device assesses whether it has received a host lock instruction.

The host operating system may recognize various events as constituting a host lock instruction. For example, if the device is idle for a set period of time, it may trigger a host lock. It will be understood by those of ordinary skill in the art that the idle timeout may need to be monitored by the host operating system, rather than the client application, since the client application may not always be in foreground on the device. Other applications may have control of the device processor. Accordingly, the client application may not be able to monitor for idle timeout in all situations. Therefore, an idle timeout may be determined by the host operating system. An idle timeout may be a host lock instruction event under step 204. There may be other events that are defined as host lock instructions. For example, a particular user key combination may trigger a host lock. If no host lock instruction is detected in step 204, then the method 200 continues to await a client or host lock event.

If a host lock instruction is received in step 204, then in step 206 the occurrence of the lock event is communicated to the client application. In particular, the host operating system communicates with the client application through the platform abstraction layer. In other words, it calls an API designed to alert the client application to the receipt of a host lock event. Once this API is called, then the method 200 continues in step 208.

In step 208, the client application starts the client security module. It recognizes the need to start the client security module from either the user selection of a client lock in step 202 or the notification received as a result of the API called by the host operating system in step 206. Once the client security module is brought up, then in step 210 the client security module implements a client lock. At step 212 the client security module then relays a message back down to the host operating system or the host security module to instruct them to perform their own lock operations. This step 212 involves calling an API to trigger the host operating system to implement a host lock, or to launch the host security module so as to implement a host lock. Accordingly, having locked the client application in step 210 control is now passed back to the host side of the device to perform a host lock. At step 214, the host lock is implemented. In one embodiment, the host lock comprises displaying a security screen, i.e. a screen saver. In other embodiments, it may include implementing a keyboard or keypad lockout as an alternative to, or in addition to, the security screen. Once the host security module implements the host lock the user is denied access to the host applications until the user performs a set of actions to unlock the device (as described below). Typically the security screen remains in the foreground until the user performs certain actions to begin unlocking the device, thereby preventing the user from accessing any host applications without satisfying the security requirements.

Following step 214, the device is in a locked state. Having detected a lock event, either on the client side or on the host side, the device has been placed in a locked state by first implementing a client lock to prevent access to the client application, and by then activating the host lock to prevent access to any of the host applications.

In some cases, the client application may demand greater security than the host device. Accordingly, it may have more robust security measures. However, running the client application on top of the host operating system may expose certain areas of the client application, such as for example user-specific data stored in memory. Under some circumstances, it may be possible to access information or operations despite the existence of client security measures. Accordingly, the remaining steps of the method 200 ensure that a user cannot disable the host lock without first satisfying the client unlocking procedure.

When in a locked state, the device displays the security screen and the host operating system or the host security module awaits entry of a keystroke in step 216. In some embodiments, the host security module implements a keypad or keyboard lock when the device is in a locked state. A particular key sequence, such as pressing the hash '#' key for a predetermined length of time or pressing a combination of keys, may be required to unlock the keyboard. In an embodiment wherein the host security module implements a keypad lock, then in step 216 the host security system evaluates whether the received keystroke detected by the host operating system satisfies the keypad unlocking requirements. If the detected keystroke does not meet the requirements, then it is ignored and the device continues to await a proper keystroke or key sequence. If the detected keystroke is the appropriate key sequence, then the host security module unlocks the keypad and proceeds to step 218.

At step 218, the host security module (or in some embodiments, the host operating system) alerts the client application to the receipt of a keystroke. In particular, the host security module calls an appropriate API to notify the client security module of the receipt of the keystroke. In one embodiment, wherein the host security application does not implement a keypad lock, the API passes the received keystroke to the client security module so that the client security module may use the received keystroke as the first character of a user-entered password. Either the client security module or the API called by the host security module may evaluate whether or not the received keystroke makes sense as a password character. For example, the entry of a directional key, like a down arrow, may be ignored by the client security module or it may cause a menu or options list to be displayed; whereas the entry of a text character may be treated as the first character of a password. When the host security module (or host operating system) calls the API to alert the client security module to the receipt of the keystroke, then control passes to the client security module.

The client security module brings a user password entry screen to the foreground on the display of the device and awaits entry of a user password. At step 220, the client security module may, in some embodiments, determine if the user has elected to cancel the password entry operation, i.e. has decided to leave the device locked. Some embodiments of the client security module may recognize a particular key combination or keystroke as a "cancel" command. The client security module may also timeout if a password is not entered after a predetermined duration. For example, if no keystrokes are received by the client security module for two minutes, then it may be deemed to have timed out. Upon cancellation or time-out, the client security module may restore control to the host security module in step 222, whereupon the host security module re-establishes its security features, such as a keypad lock and display of a screen saver. The client security module may pass control to the host security module by calling the lock command API, as was called in step 212. The device is thus returned to a locked state and waits in step 220 for entry of a keystroke.

If the user does not indicate a cancellation or time out, then the client security module evaluates the password entered by the user in step 224. If the password is invalid, then the client security module applies its password retry policies in step 226 to determine whether or not the user is entitled to retry the password entry. The policies may establish a maximum number of attempts. In some embodiments, as shown by step 228, after the maximum number of attempts is reached, the device is disabled through a "kill device" operation in which the user data stored on the device is deleted. This may also involve calling a kill API to cause the host operating system or the host security module to delete or wipe particular user data from the system. Other actions may be taken in addition to or as an alternative to the "kill operation" in response to a maximum number of password attempts.

If the password is valid, then the method 200 continues as step 230, wherein the client security module unlocks the client-side of the device. In step 232, the client security module then passes control to the host security module with instructions to unlock the device. It may pass control by calling a host unlock API to alert the host security module to the successful entry of a password for unlocking the device. The client security module may also close after unlocking the client-side of the device. In step 234, the host security module performs operations necessary to unlock the host-side of the device, such as closing or minimizing a screen saver or other actions. The host security module may then be closed in step 236.

Following step 236, the device is in an unlocked state and the method 200 returns to step 202 to await the initiation of further lock operations.

It will be appreciated by those of ordinary skill in the art that the method 200 may include other steps or actions to accommodate devices or security module having different features. For example, the security modules may permit the user to make E911 emergency calls while the device is locked. Accordingly, at around step 220, the client security module may detect a user selection of a E911 emergency call. This may be a selectable menu action item presented to the user on the client password entry interface screen. When the user selects an E911 emergency call, the client security module may call an E911 API to instruct the host operating system or other host applications to place the emergency call, despite the locked state of the device.

It will also be appreciated that the user or another entity, such as a client administrator, may elect to change the idle timeout value or other relevant configuration values or options. If the timeout value is changed, for example by the user through a menu option presented by the client application, then the client application calls an idle timeout change API to instruct the host operating system to update the idle timeout value, since this value is monitored by the host operating system. The current idle timeout value may be communicated to the host operating system by the client application upon start-up of the device through the call of the same or a similar API.

Other variations to the method 200 will be understood by those of ordinary skill in the art in view of the foregoing description.

In one embodiment, the unlocking operation on start-up may differ from the unlocking operation described in the method 200 shown in FIG. 3. When powering on a mobile device, it may power up in a locked state. The start-up or power-on process may, in some embodiments, take an unacceptable length of time. In particular, it may take an unacceptable length of time for the Java Virtual Machine to load and for the client security module to be started. Until the JVM and the client security module are started, the user cannot enter a password to enable the device. The result is that the user is unable to use the mobile device, even for host applications, such as mobile telephony, until the client applications are loaded and available.

The client security module typically performs password verification by calling a validation function. The password information is stored in persistent storage on the device and the validation function is designed to compare user input information with the stored password information. The validation function does not depend on initialization of the client security module to be accessible. Accordingly, in one embodiment, an API is provided in the platform abstraction layer to enable the host-side to call the validation function.

To address the delay on start-up, in one embodiment the host includes a host start-up module that essentially mirrors the dialog of the client security module in requesting an unlock password. Accordingly, on start-up the host start-up module displays a user input dialog screen to prompt the user to enter a valid password. Once the user enters a password, the host calls the client-side validation function through the platform abstraction layer and passes it the entered password. The validation function determines whether or not the password is valid and returns an answer to the host start-up module. If the password is valid, then the host start-up module notifies the host security module and the host-side is unlocked. In some embodiments, the client-side is not locked on start-up, so the full range of device applications is available once the host-side is unlocked. In another embodiment, the client-side is locked on start-up, so either the validation function or the host start-up module notify the client security module that a valid password has been entered so that the client-side is also unlocked once the client-side applications have been initialized. It will be understood that the host start-up module may comprise a part of the host security module. The client security module may be configured to suppress its password dialog screen on start-up on the assumption that password input will be handled by the host-side in this situation.

Figure 4:
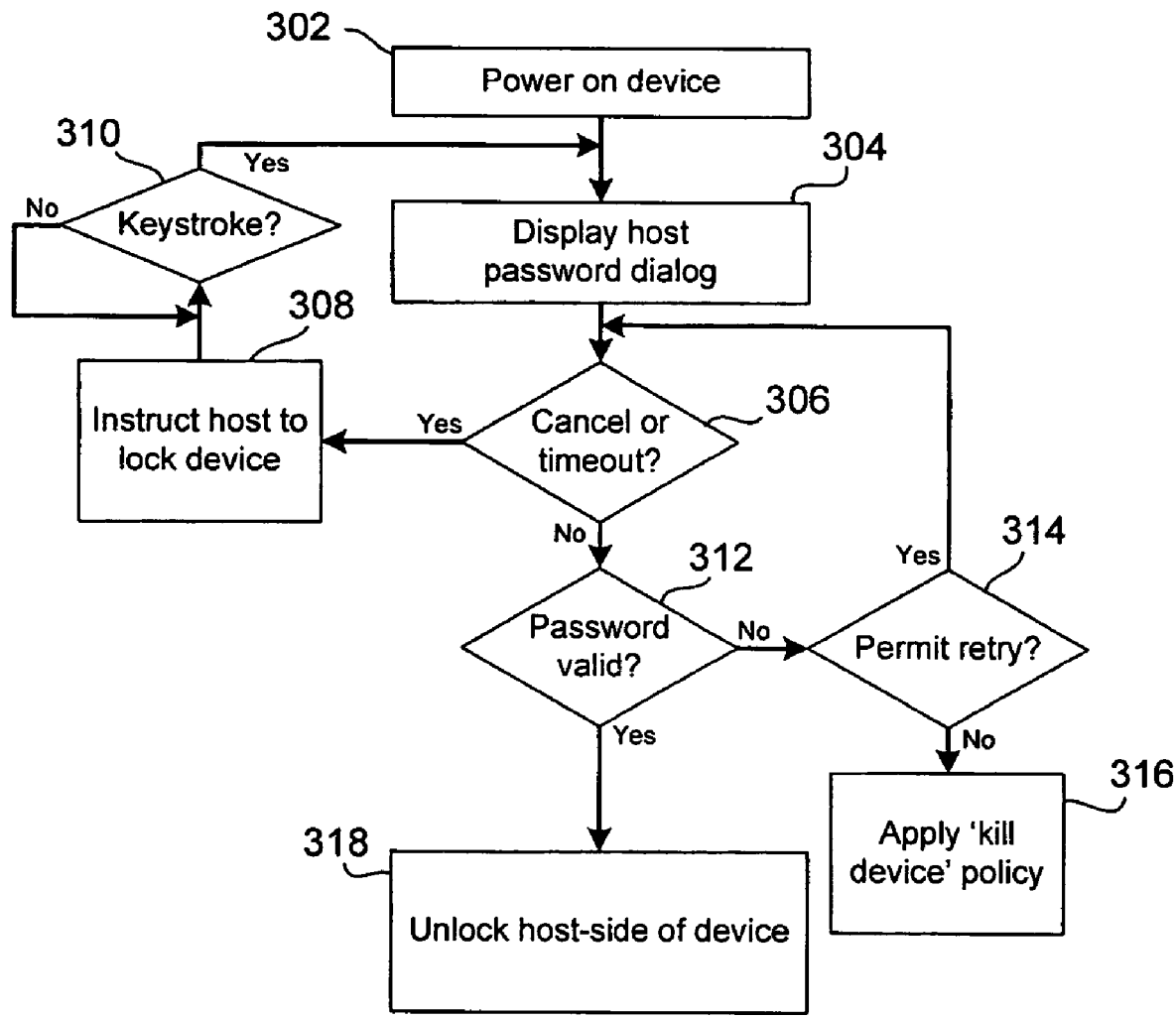
FIG. 4 shows, in flowchart form, a method for unlocking a mobile device on start-up.

Reference is now made to FIG. 4, which shows, in flowchart form, a method 300 for unlocking a mobile device on start-up. The method 300 begins in step 302 with the start-up or powering-on of the device. In the present embodiment, the device powers on with a host lock in place, meaning that the user cannot access the host or client applications.

On start-up the host launches the host start-up module, which may comprise a portion of the host security module, to display a password dialog to solicit user password input, as shown in step 304. The device awaits user input in this state. In one embodiment, the device may have a cancel option, or may timeout while waiting for user input, as shown in step 306. If so, then the host security module 308 may display a security screen in step 308 and await a keystroke in step 310 before re-displaying the password dialog to solicit user password input.

If a password is received, then in step 312 the device evaluates whether it is a valid password. In particular, the host start-up module (or host security module) calls the validation function through an API provided via the platform abstraction layer and passes the received passwords. A result is returned indicating whether or not the entered password is valid. If it is not valid, then in step 314 the host start-up module assesses whether the user should be permitted to retry. As outlined above, there may be a predefined maximum number of attempts permitted. If the maximum number is exceeded, then certain "kill device" operations may be implemented in step 316.

If the password is valid, then in step 318 the host-side of the device is unlocked. As noted above, in many embodiments, the client-side will not be locked on start-up, meaning that only the host-side must be unlocked. If the client-side is locked on start-up, then the method 300 includes a further step (not shown) in which the host start-up module (or host security module) calls a client unlock API to instruct the client security module to unlock the client-side of the device.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for coordinating a client security module with a host security module, wherein both modules are resident on a mobile electronic device with a client-side and a host-side, the method comprising the steps of:
 detecting a lock event;
 implementing one of a client-side lock of a client-side and a host-side lock of the host-side by one of the client security module and the host security module, respectively, in response to the lock event;
 sending a lock command from said one of the client security module and the host security module to the other of the client security module and the host security module; and
 implementing the other of a client-side lock of the client-side by the client security module and a host-side lock of the host-side by the host security module in response to said lock command.

2. The method claimed in claim 1, wherein said step of detecting a lock event includes alerting the client security module to said lock event.

3. The method claimed in claim 2, wherein said step of alerting the client security module to the lock event comprises calling an application programming interface for alerting the client security module to the lock event.

4. The method claimed in claim 1, wherein said step of sending comprises sending the lock command through a platform abstraction layer.

5. The method claimed in claim 1, wherein said step of sending comprises calling an application programming interface for instructing said other of the client security module and the host security module to implement the other lock.

6. The method claimed in claim 1, wherein said step of implementing the other a lock comprises launching a security screen.

7. The method claimed in claim 1, wherein said steps of implementing a lock comprises locking a keypad.

8. The method claimed in claim 1, wherein said step of implementing a first lock operation comprises preventing user access to data stored on the device.

9. A mobile electronic device, comprising:
 a processor, and
 memory,
 and stored in memory to cause the processor to control the device:
 a host operating system;
 a host security module, wherein the host operating system and the host security module are resident on a host-side of the device;
 a client application, the client application including a client security module, wherein the client application is resident on a client-side of the device; and
 an abstraction interface layer between the client-side and the host-side, said abstraction layer including a plurality of application programming interfaces for exchanging communications between the client security module and the host security module, and
 wherein said client security module includes a component for implementing a client-side lock of the client-side in response to a lock event and for calling one of said application programming interfaces for instructing said host security module to implement a host-side lock of the host-side.

10. The mobile electronic device claimed in claim 9, wherein said host security module includes a component for performing a host-side lock in response to said call from said client security module.

* * * * *